(12) United States Patent
Takatori et al.

(10) Patent No.: US 8,117,444 B2
(45) Date of Patent: Feb. 14, 2012

(54) HOST COMPUTER, MOBILE COMMUNICATION DEVICE, PROGRAM, AND RECORDING MEDIUM

(75) Inventors: Sunao Takatori, Tokyo (JP); Hisanori Kiyomatsu, Tokyo (JP)

(73) Assignee: Daita Frontier Fund, LLC, Wilmington, DE (US)

( * ) Notice: Subject to any disclaimer, the term of this patent is extended or adjusted under 35 U.S.C. 154(b) by 1583 days.

(21) Appl. No.: 10/070,221

(22) PCT Filed: Jun. 28, 2001

(86) PCT No.: PCT/JP01/05597
§ 371 (c)(1),
(2), (4) Date: Aug. 19, 2002

(87) PCT Pub. No.: WO02/01376
PCT Pub. Date: Jan. 3, 2002

(65) Prior Publication Data
US 2003/0105960 A1  Jun. 5, 2003

(30) Foreign Application Priority Data
Jun. 28, 2000 (JP) .................. 2000-193957

(51) Int. Cl.
*H04L 9/32* (2006.01)
(52) U.S. Cl. ........ 713/168; 713/155; 713/161; 713/167; 713/169; 380/229; 380/232; 380/247; 726/17; 726/18; 726/19; 726/20; 705/64; 705/75; 705/67; 705/80
(58) Field of Classification Search .......... 713/155, 713/161, 168–170; 726/6, 17–21; 380/229, 380/232, 247, 155, 161, 168–170; 705/64, 705/75, 67, 80
See application file for complete search history.

(56) References Cited

U.S. PATENT DOCUMENTS

| | | | | |
|---|---|---|---|---|
| 5,724,423 A | * | 3/1998 | Khello | 713/184 |
| 5,914,472 A | * | 6/1999 | Foladare et al. | 235/380 |
| 6,256,737 B1 | * | 7/2001 | Bianco et al. | 713/186 |
| 6,282,658 B2 | * | 8/2001 | French et al. | 726/7 |

(Continued)

FOREIGN PATENT DOCUMENTS
JP  06-215009  8/1994
(Continued)

OTHER PUBLICATIONS

International Search Report for Appln. No. PCT/JP2001/05597 issued Sep. 25, 2001, 1 pg.

*Primary Examiner* — Edan Orgad
*Assistant Examiner* — Canh Le
(74) *Attorney, Agent, or Firm* — Sterne, Kessler, Goldstein & Fox, PLLC

(57) ABSTRACT

The object of the present invention is to provide an authentication system capable of achieving suitable authentication processing while guaranteeing the maximum convenience for the customer.

A first communication terminal PD1 is built into a television TV that can be connected to the Internet, and communications with an authentication control company BS are possible via the first communication terminal PD1. The authentication control company BS is, for example, a telecommunications company, and performs authentication control for a plurality of product supplier companies SP1 to SP3 according to the product purchase status on the television TV.

Furthermore, the present invention simplifies the appropriate procedures by setting authentication levels for authentication control.

14 Claims, 6 Drawing Sheets

U.S. PATENT DOCUMENTS

| | | | |
|---|---|---|---|
| 6,321,339 B1 * | 11/2001 | French et al. | 726/2 |
| 6,496,936 B1 * | 12/2002 | French et al. | 726/7 |
| 6,516,056 B1 * | 2/2003 | Justice et al. | 379/145 |
| 6,609,198 B1 * | 8/2003 | Wood et al. | 713/155 |
| 6,636,833 B1 * | 10/2003 | Flitcroft et al. | 705/64 |
| 6,892,307 B1 * | 5/2005 | Wood et al. | 726/8 |
| 7,050,993 B1 * | 5/2006 | Piikivi et al. | 705/26 |
| 7,086,085 B1 * | 8/2006 | Brown et al. | 726/7 |
| 7,110,987 B2 * | 9/2006 | Engelhart | 705/75 |
| 7,305,562 B1 * | 12/2007 | Bianco et al. | 713/186 |
| 7,571,142 B1 * | 8/2009 | Flitcroft et al. | 705/44 |
| 2001/0001877 A1 * | 5/2001 | French et al. | 713/182 |

FOREIGN PATENT DOCUMENTS

| | | |
|---|---|---|
| JP | 09-081519 | 3/1997 |
| JP | 2000-76336 | 3/2000 |
| JP | 2000-92236 | 3/2000 |

* cited by examiner

HOST COMPUTER, MOBILE COMMUNICATION DEVICE, PROGRAM, AND RECORDING MEDIUM

FIELD OF TECHNOLOGY

The present invention relates to a host computer, a mobile communication device, a program and a storage medium for the use in an authentication system for supplying various kinds of goods and services.

PRIOR ART

At present, the supply of various kinds of products, including services, via communications lines, such as the supply of Internet contents and transactions at Internet Malls, is rapidly spreading, and the terminals used therein range widely from the personal computer to mobile communication devices, to various kinds of home appliances. That is, it is quite likely that in future, the majority of electronic equipment, service devices, and other equipment will be provided with a function to purchase for-fee products via communications lines.

Moreover, with increasing popularity of financial services such as credit cards and the like, and there are increasingly diverse billing formats, and increased convenience for the consumer. These financial services are expected to be combined with mobile communication devices, such as mobile phones, to provide even greater levels of convenience, while, on the other hand, however, problems such as debit card forgery and theft have arisen.

The situation described above further increases the importance of authenticating customers who have purchased products. Nevertheless, convenience will suffer if complicated operations for authentication are required every time the equipment is used.

The present invention was invented in view of the above background and it is an object thereof is to provide an authentication system and a host computer, a mobile communication device, a program and a storage medium for the aforementioned system capable of achieving appropriate authenticating processing while guaranteeing the maximum convenience for the user, when various kinds of products and services are provided.

DISCLOSURE OF THE INVENTION

In order to achieve the above described object, a host computer as set forth in the present invention is characterized in that it comprises:

a first receiving means for receiving, from a service device, collation information that requests authentication of the party in question;

a second transmitting means for transmitting request information that requests information regarding the authentication to a mobile communication device in response to reception of collation information by said first receiving means;

a second storage means for storing information regarding the authentication of a plurality of persons;

a second receiving means for receiving information regarding authentication from aforementioned mobile communication device;

a comparing means for comparing information regarding the authentication received by said second receiving means with information regarding authentication stored in aforementioned second storage means; and a first transmitting means for transmitting authentication information that authenticates a party in question according to comparison results from said comparing means to the aforementioned service device.

Furthermore, the aforementioned information regarding the authentication is characterized in that it is ID information of a user or personal attributes of a user.

Furthermore, the aforementioned first receiving means is characterized in that it receives information regarding the services provided by the service device, and further comprises an authentication selecting means for selecting an authentication level according to the information regarding said services.

Furthermore, the aforementioned authentication selecting means compares the past service provision history with services to be provided at present and selects the authentication level based on a result of that comparison.

Furthermore, the aforementioned authentication selecting means is characterized in that it selects an authentication level based on at least any one of cost of service, service provision region, service provision frequency and a total sum of money for service provided.

Furthermore, in order to achieve the aforementioned object, the mobile communication device as set forth in the present invention is characterized in that it comprises:

a third receiving means for receiving, from the host computer, request information that requests information regarding authentication;

a first storage means for storing information regarding authentication; and a third transmitting means for transmitting information regarding authentication, stored in said first storage means, to the aforementioned host computer, in response to the reception of request information by the aforementioned third receiving means.

Furthermore, it is characterized in that it has a fourth transmitting means for transmitting information regarding authentication to the service device.

Furthermore, the aforementioned third transmitting means is characterized in that it selectively transmits, to the aforementioned host computer, the type of information regarding authentication requested by the aforementioned request information.

Furthermore, the function of the mobile communication device as set forth in the present invention can be also achieved by causing a computer to execute a program, and such a program can be loaded on a recording medium that can be read by a computer.

A method of authenticating by using the host computer and the mobile communication device as set forth in the present invention (hereinafter termed "the authentication method as set forth in the present invention") is based on both the communications between the first communication terminal built into the service device and the host computer, and the communications between the host computer and the mobile communication device (the second communication terminal). Higher reliability of authentication can be achieved thereby. In this way, when various kinds of products and services are provided, appropriate authentication processing can be achieved while guaranteeing maximum convenience for the customer.

Furthermore, in the authentication method as set forth in the present invention, in the communication between the host computer and the mobile communication device (the second communication terminal), the user may be asked for his ID information (identification information) or information regarding the personal attributes of the user, and authentication may be performed based on the response thereto.

Furthermore, in the service device as set forth in the present invention, a card reader for reading the information from the storage medium whereon the user's ID information is stored is further provided, and the service device can read the ID information of the storage medium, and the authentication method as set forth in the present invention is such that the first communication terminal transmits the ID information read by the card reader to the host computer, and the host computer notifies the mobile communication device (the second communication terminal) of the ID information based on this information and confirms the response of the mobile communication device (the second communication terminal) thereto. In this way, convenience and reliability can be increased, while using a conventional storage medium is used.

Furthermore, in the authentication method as set forth in the present invention, and in addition, in the communication between the host computer and the mobile communication device (the second communication terminal), the identifiable communication information between the first communication terminal and the mobile communication device (the second communication terminal) is notified to the mobile communication device, and this information is confirmed by comparison with the information necessary for authenticating a communication history, a control transfer history, or the like and the authentication is performed based on the confirmation result thereof. This enables a further increase in the reliability of authentication.

Furthermore, in the authentication method as set forth in the present invention, a plurality of authentication levels, and a control transfer permission condition relating to each authentication level, are stored in advance in the second storage means of the host computer or the third storage means of the service device so that an authentication level can be selected according to the object of the authentication when the user desires the authentication of the party in question. That is, the authentication level can be selected by comparing the past service provision history with the services to be provided at present.

Furthermore, in the authentication method as set forth in the present invention, when the object of the authentication is to purchase products, the products are compared with the price for the products and the past product purchase history, and the authentication level is selected based on the result of the comparison. Increased convenience can be achieved thereby.

Furthermore, in the present invention, the host computer may automatically analyze trends in product purchasing by the user and compare the analysis result with said products.

Furthermore, in the authentication method as set forth in the present invention, when the object of the authentication is to purchase a product, the authentication level can be selected based on at least any one of cost of service, service provision region, service provision frequency and a total sum of money for the service provided. Increased convenience can be achieved thereby.

Furthermore, in the present invention, the service device may be equipment capable of providing a product to the user and may provide the product after confirming a billing process for the user after the authentication of the person in question.

Furthermore, in the authentication method set forth in the present invention, the first communication terminal and the host computer are connected by a mobile communication line, and the host computer and the mobile communication device (the second communication terminal) are connected by the mobile communication line. The degree of freedom in the installation location, etc. of the first communication terminal is increased thereby.

Furthermore, in the authentication method set forth in the present invention, the first communication terminal and the host computer are connected by a fixed line, and the host computer and the mobile communication device (the second communication terminal) are connected by a mobile communication line. The communication reliability of the first communication terminal is increased thereby.

Furthermore, in the authentication method as set forth in the present invention, when a line condition is not good between the mobile communication device (the second communication terminal) and the host computer, communication that should be performed between the mobile communication device (the second communication terminal) and the host computer is executed between the first communication terminal and the host computer. Line problems can be handled easily thereby.

The descriptions in the specification and/or the drawings of Japanese Patent Application 2000-193957, which is the foundation for the priority of the present patent application, are incorporated [by reference] into the present specification.

BEST MODE FOR CARRYING OUT THE INVENTION

Next, embodiments of authentication systems constituted using a host computer, a mobile communication device, a program, and a recording medium as set forth in the present invention (hereinafter termed "the authentication system as set forth in the present invention") will be described based on the drawings.

Figure 1:
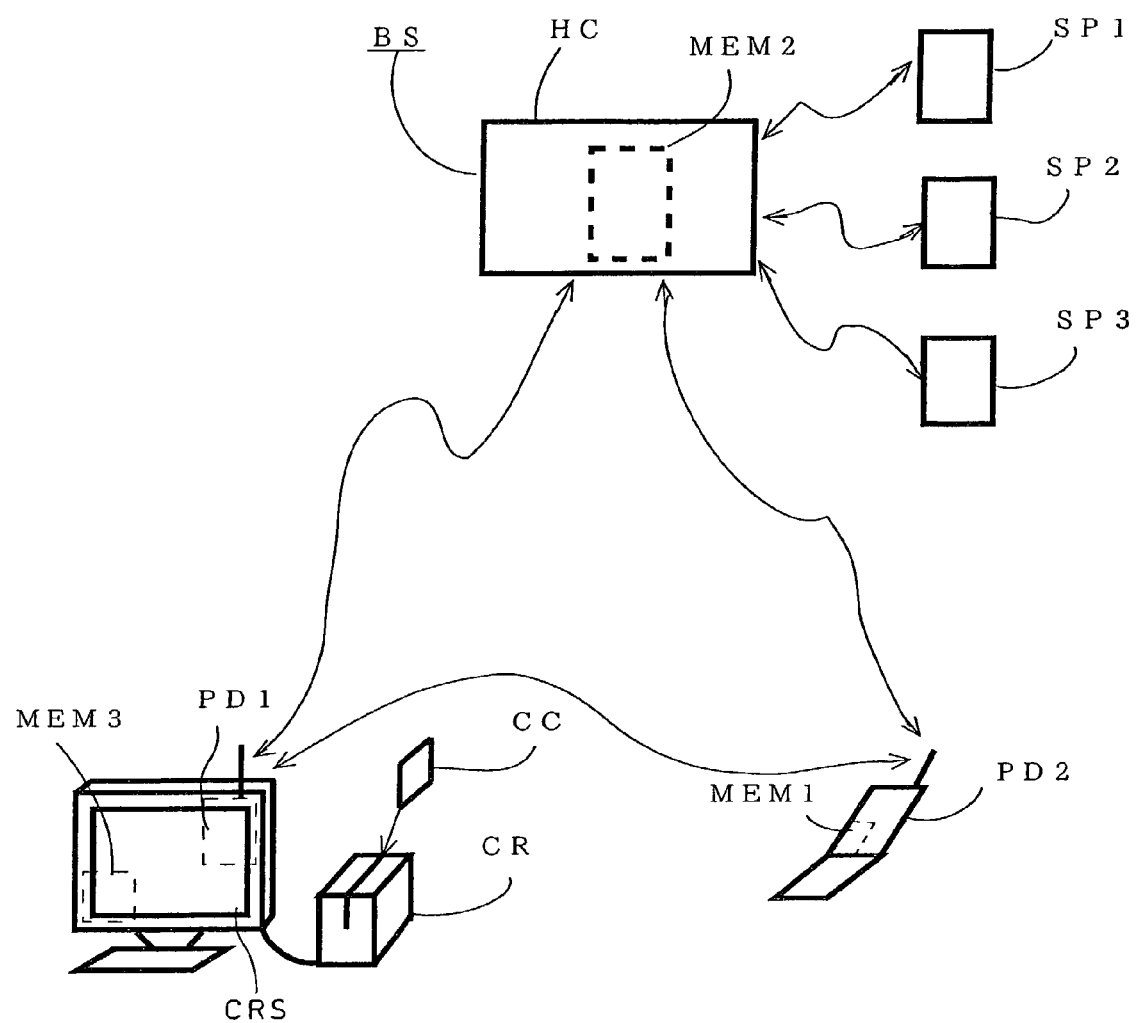
FIG. 1 is a block diagram illustrating the structure of a first embodiment of an authentication system as set forth in the present invention.

FIG. 1 illustrates a structure of a first embodiment of an authentication system as set forth in the present invention, illustrating an authentication system having a card reader system (CRS) for reading a storage medium (CC) for storing user ID information, such as a credit card. A card reader (CR) is connected to the card reader system CRS (service device), and the first communication terminal (PD1) (in this case, for mobile communication) of a built-in type (embedded type) is incorporated into the card reader system CRS, and the user (customer) can communicate with a host computer (HC) of an authentication control company (BS) through the first communication terminal PD1. The authentication control company BS is, for example, a communication service company, and performs the authentication control for a plurality of product supplier companies (SP1 to SP3) (and while three companies are shown in the drawing, the [actual] number is discretionary) according to product purchasing statuses in the card reader system CRS (service device). The product supplier companies SP1 to SP3 include not only service providing companies that provide services such as credit services, cash services, and the like, but also product supplier companies that provide various products, as shown in Table 1, via the Internet and, additionally, include financial institutions, securities companies, real estate companies, mass communication-related companies such as satellite broadcasting, cable television, newspapers, radio broadcasting, publishing and the like, and so forth.

Here, for convenience, processing devices of the product supplier companies SP1 to SP3 are also designated as SP1 to SP3. These processing devices SP1 to SP3 are connected to a host computer HC of the authentication control company BS via a public communication line or dedicated line.

TABLE 1

Examples of provided products

| | Provided Products |
|---|---|
| Internet Contents | Product information, corporate information and other information provision services Music distribution services Book distribution services Game distribution services Services for providing image information such as photographs, paintings and the like |
| Internet mall, shopping channel | Various kinds of products, monetary notes |
| Finance | Internet banking |
| Securities | Brokerage of securities trading |
| Real Estate | Brokerage of real estate trading |
| Mass Communication | Satellite broadcasting, cable television Newspapers, publication Radio |

The host computer HC comprises: a first receiving means for receiving the collation information for requesting an authentication of the person in question from the service device; a second transmitting means for transmitting request information for requesting information regarding authentication to a mobile communication device PD2 (the second communication terminal; in this case, a portable telephone) in response to the reception of the collation information by the first receiving means; a second storage means MEM2 for storing the information regarding the authentication of a plurality of persons; a second receiving means for receiving information regarding authentication from the mobile communication device (the second communication terminal); the comparison means for comparing information regarding authentication received by the second receiving means with information regarding authentication stored in the second storage means MEM2; and a first transmitting means for transmitting authentication information for authenticating the person in question to the service device according to the result of comparison by the comparison means.

Furthermore, the mobile communication device (the second communication terminal) PD2 comprises: a third receiving means for receiving the request information for requesting information regarding authentication from the host computer HC; a first storage means (MEM1) for storing information regarding authentication; and a third transmitting means for transmitting information regarding authentication stored in the first storage means MEM1 to the host computer HC in response to the reception of request information by the third receiving means.

An authentication method using a host computer HC and a mobile communication device (the second communication terminal) PD2 will be described next.

First, collation information for requesting the authentication of the party in question is transmitted from a first communication terminal PD1 of the service device (card reader system) CRS to a host computer HC.

When the host computer HC receives collation information, for requesting the authentication of the party in question, from the first communication terminal PD1 through a first receiving means, [this host computer HC] transmits request information, for requesting information regarding authentication, to a mobile communication device (a second communication terminal) PD2 through a second transmitting means in response to the reception of the collation information by the first transmitting means.

When the mobile communication device (the second communication terminal) PD2 receives request information, for requesting information regarding authentication from the host computer HC, through a third receiving means, [the mobile communication device (the second communication terminal) PD2] transmits information regarding authentication, which is stored in the first storage means MEM1, to the host computer HC through the third transmitting means in response to the reception of request information by the third receiving means.

When the host computer HC receives the information regarding authentication from the mobile communication device (the second communication terminal) PD2 through the second receiving means, [the host computer HC] compares the information regarding authentication received by the second receiving means with information regarding authentication stored in second storage means MEM2 through the use of comparing means, and transmits authentication information for authenticating the party in question to the first communication terminal PD1 of the service device (card reader system) CRS, through the first transmitting means, according to the query result.

While conventionally a signature by the user has been required when executing an authentication procedure as to whether or not the use of a storage medium CC is legal, in the present embodiment, in order to reduce the load on the user and to speed up authentication processing, when the use of the CC storage medium is communicated as the collation information to the host computer HC from the card reader system CRS, the host computer HC of the authentication control company BS communicates with the second communication terminal PD2 (mobile communication device, portable telephone) owned by the user and requests information regarding authentication (sends request information).

The second communication terminal PD2 is provided with the storage means MEM1 for storing the user ID information, and, in response to the request from the host computer HC, the user ID information (information regarding authentication) is read from the first storage means MEM1 and sent back to the host computer HC. When the host computer HC receives the user ID information from PD2, [the host computer HC] compares the ID information with information regarding authentication stored in second storage means MEM2 through the use of comparing means. If the use of the storage medium CC is legal, the authentication of the party in question is established and the reliability of the authentication can be increased thereby.

Conversely, the host computer HC accumulates in advance, in the second storing means MEM2, information regarding the personal attributes of the user, and asks a question regarding the personal attributes of the user to the second communication terminal PD2. The host computer HC can confirm that the use of the storage medium CC by the user is legal when the user operates the second communication terminal PD2 to answer the question to the host computer HC and the answer (information regarding the personal attributes) is correct. Furthermore, the second communication terminal PD2 can also transmit information selectively, to the host computer HC, regarding the type of the authentication requested by request information from the host computer HC.

To a user skilled in operating the second communication terminal (portable telephone) PD2, an authentication process using the second communication terminal PD2 is extremely simple when compared to the inputting of the signature. Furthermore, the confirmation of the second communication terminal PD2 in addition to the ID information of the storage medium CC can increase the reliability of the authentication remarkably.

When the authentication of the party in question is completed in the host computer HC, the authentication information is transmitted to the first communication terminal PD1 from the host computer HC. The notification of this authentication is performed by transmitting a specific authentication code or the like.

Furthermore, the mobile communication device (the second communication terminal) PD2 comprises a fourth transmitting means for transmitting information regarding authentication to the service device and the convenience and reliability of authentication can be increased even more through the addition, to the conditions of the authentication, of communication between the first communication terminal PD1 and the second communication terminal PD2. For example, the user ID information and other information are transmitted from the second communication terminal PD2 to the first communication terminal PD1, and the first communication terminal PD1 transmits, to the host computer HC, this information, which was sent from the second communication terminal PD2, together with the ID information of the storage medium CC. The host computer HC is provided with second storage means MEM2, where this second storage means MEM2 stores a correspondence relationship (any information regarding the communication history or the control transfer history the individual user using the card reader system CRS) between the user ID information and the second communication terminal PD2 of the user, and, based on this correspondence relationship, the host computer HC transmits the ID information of the aforementioned storage medium CC and information regarding the correspondence relationship to the second communication terminal PD2. The second communication terminal PD2 compares this information transmitted from the host computer HC with the communication history, the control transfer history were the like stored, in the first storage portion MEM1 of the second communication terminal PD2, and, if there is a match, a reply to that effect is returned to the host computer HC.

As described above, in the present embodiments, various types of authentication procedures can be used, by determining a reference for selecting the authentication procedure according to the purpose of the authentication, to achieve optimal convenience and reliability. For example, when the purpose of the authentication is to purchase a product, the authentication level can be set by the price thereof as shown in Table 2, and the authentication procedure for this can be set as shown by Table 3.

TABLE 2

Examples of the authentication levels

Authentication Level 1

The price of the product is equal to or less than a first specific value.
The first specific value is for example, ¥5,000.
Authentication Level 2

The price of the product is more than the first specific value and is equal to or less than a second specific value. The second specific value is, for example, ¥10,000.
Authentication Level 3

The price of the product is more than the second specific value.

TABLE 3

Examples of control transfer permissions

Authentication Level 1

It is unconditionally authenticated. However, confirmation after the fact is made regarding the second communication terminal.
Authentication Level 2

Authentication control company BS makes a prior confirmation regarding the second communication terminal PD2 about product purchases.
Authentication Level 3

Authentication control company BS makes a prior confirmation regarding the first communication terminals PD1 and the second communication terminal PD2 about product purchases.

That is, when the price of the product is equal to or less than the first specific value, there is unconditional authentication as authentication level 1. However, confirmation after the fact is made regarding the second communication terminal PD2. When the price of the product is more than the first specific value and is equal to or less than the second specific value, the authentication control company BS makes a prior confirmation about the purchase of the product regarding the second communication terminal PD2, as authentication level 2. When the price of the product is more than the second specific value, the authentication control company BS makes a prior confirmation about the purchase of the product regarding the first communication terminal PD1 and the second communication terminal PD2, as authentication level 3.

The first receiving means of the host computer HC is provided with authentication selecting means for receiving information regarding the services provided from the service device and selecting the authentication level according to this information regarding the services, enabling the authentication procedure to be changed according to the authentication level. That is, the host computer HC stores the authentication levels and the authentication procedures in the second storage means MEM2, and when collation information for requesting the authentication of the party in question and information regarding the services are received from the first communication terminal PD1 through the first receiving means, the host computer HC selects the query level according to information regarding the services, referencing the second storage means MEM2, through the use of the authentication selection means. After that, in order to perform the authentication procedure based on the authentication level, either request information for requesting information regarding authentication is sent to the mobile communication device (the second communication terminal) through the second transmitting means for a prior confirmation, or a confirmation is performed after the fact. In the case of the prior confirmation, authentication information for authenticating the party in question according to the comparison result is sent to the first communication terminal PD1 of the service device (card reader system) CRS through the first transmitting means.

When the authentication by the host computer HC is not necessary, such as in the process for authentication level 1, storing the authentication levels and the authentication procedure in the third storage means MEM3 of the first communication terminal PD1 in advance, enables the first communication terminal PD1, that is, the card reader system CRS (service device), to provide the product to the user without waiting for the reception of an authentication code from the host computer HC, if it is confirmed that the price of the product is equal to or less than the first specific value. However, a confirmation after the fact is a made regarding the second communication terminal and, after the fact, the product supplying company SP is notified to that effect via the host computer HC.

Figure 2:
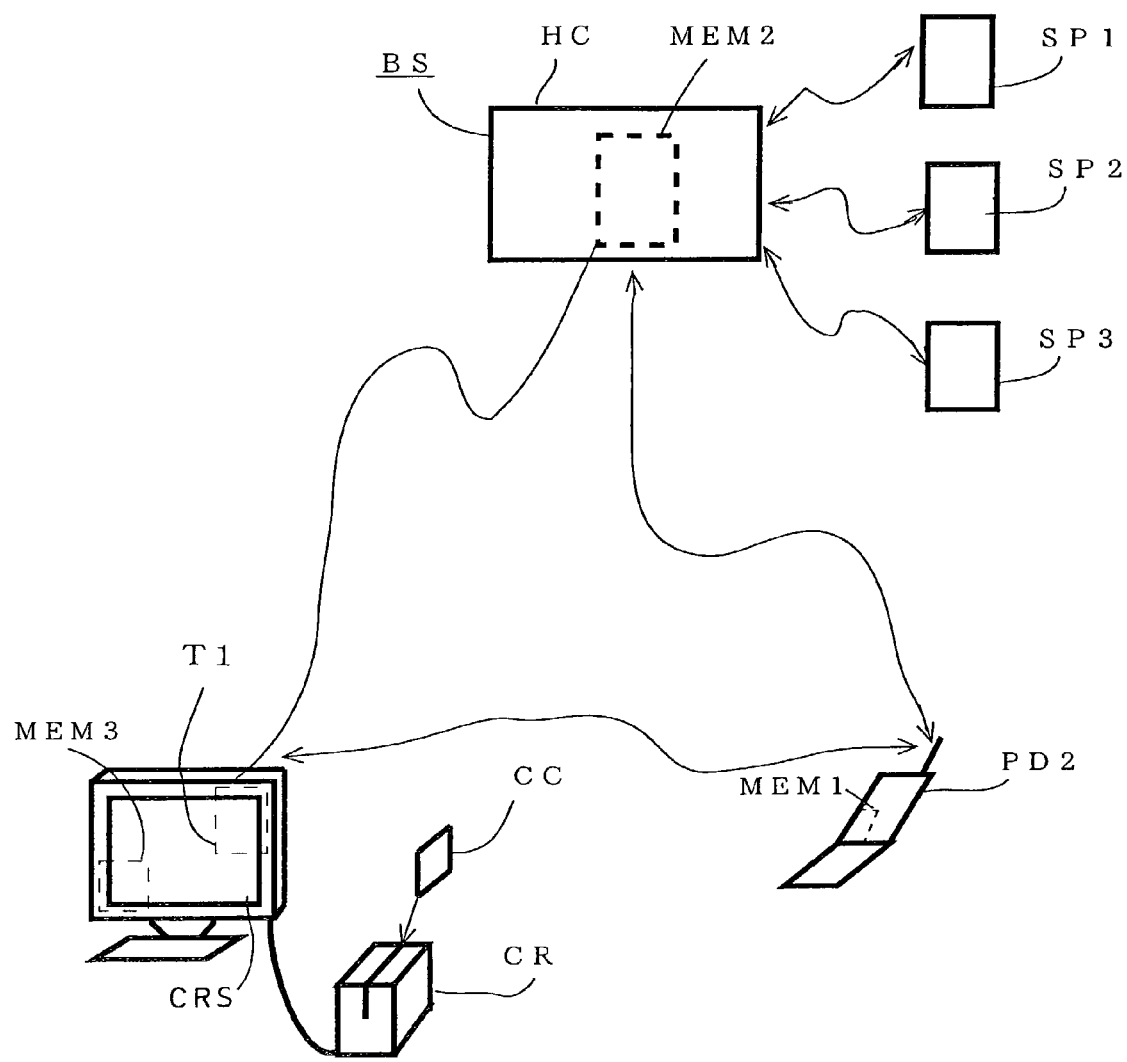
FIG. 2 is a block diagram illustrating the structure of a second embodiment of an authentication system as set forth in the present invention.

FIG. 2 illustrates a second embodiment, wherein the first communication terminal T1 of a fixed line is used in place of the first communication terminal PD1 (for mobile communication) of the first embodiment. The first communication terminal T1 is built into the card reader system CRS (service device). The other constituent components are identical to those of the first embodiment, so descriptions thereof will be omitted. The aforementioned structure enables the application of the authentication system of the present invention, even in cases where the status of the mobile communication line in the location of installation of the service device is not good.

When the first communication terminal T1 of the fixed line is used, the authentication procedure by the communication between the second communication terminal PD2 and the host computer HC can be also executed by the communication between the first communication terminal T1 and the host computer HC. This is effective when the line status of the second communication terminal is bad.

Figure 3:
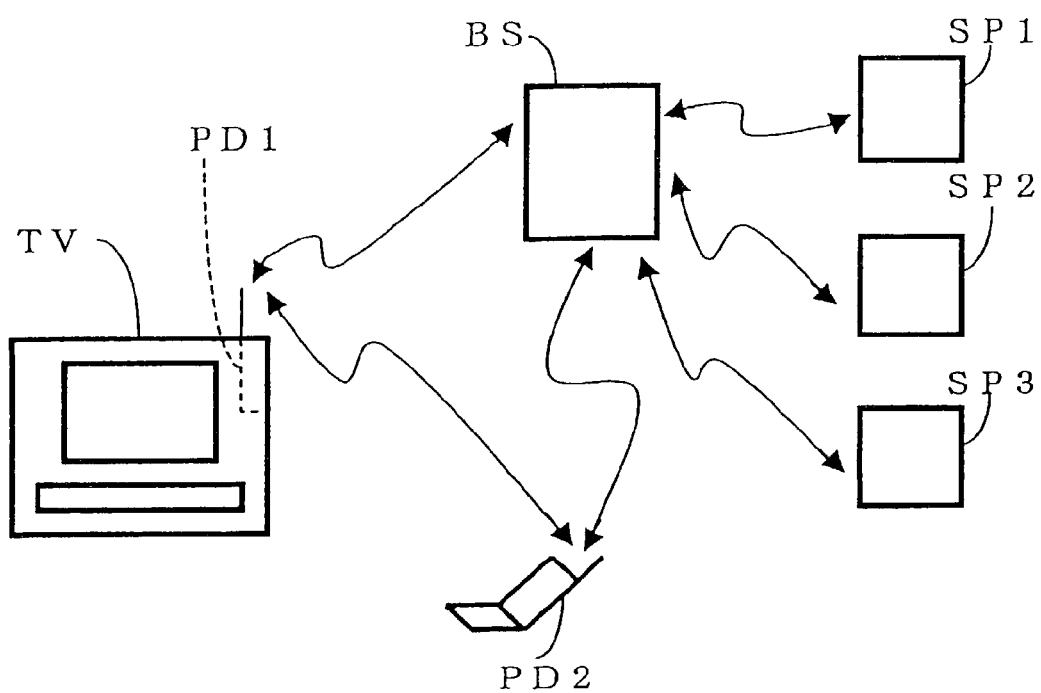
FIG. 3 is a block diagram illustrating the structure of a third embodiment of an authentication system as set forth in the present invention.

FIG. 3 illustrates a third embodiment for authentication in a television TV (service device) that can connect to the Internet. A first communication terminal PD1 (in this case, for the mobile communication) of a built-in type (embedded type) is built into the television TV, where the television TV can communicate with the authentication control company BS via the first communication terminal PD1.

The owner or the manager of the service device TV can access a variety of product supplier companies by a specific authentication procedure using the first communication terminal PD1, and the use of the video display functions and distribution functions of the television reduces limitations on the products that can be traded, remarkably invigorating economic activities.

Furthermore, if the use of television TV by a large number of unspecified customers is enabled, a broad range of customers' needs can be handled, thus invigorating economic activities even further. However, in this case, it is necessary to perform billing appropriately for customers who used the television TV (service device), and there is a concern that the authentication and the billing procedure of the individual customers may become complicated.

Additionally, in the present embodiment, when the charges for the purchase of products are to be borne by individual customers, a "control transfer mode" can be set up wherein control regarding charges is transferred to the customer's side. When the "control transfer mode" is set up, a plurality of customers perform payment processes after they have been authenticated, making it impossible for the owner or the manager of the service device to be charged.

The customer (not shown) calls a first communication terminal PD1 (used by a plurality of customers) from a second communication terminal PD2 (a mobile communication device, in this case, a portable telephone) owned by the customer, and inputs a specific code (a number, a code, or the like), so that the service device TV can be used for the purpose of the billing of the customer. Guaranteeing the customer to be a legal through the authentication of the second communication terminal PD2 in this way enables customer authentication such that the second communication terminal PD2 itself is taken as the ID information, enabling appropriate billing to be performed. Additionally, customer authentication operations are relatively simple, not compromising convenience.

At this time, information regarding billing is sent from the first communication terminal PD1 to the host computer HC of the authentication control company BS. Accordingly, regardless of whether or not the "control transfer mode" is used, information regarding billing may be transmitted together with information regarding authentication, and it is not necessary to change the form of the transmission for billing information on the service device TV.

In other words, when the price of the commodity is equal to or less than the first predetermined value, the authentication level 1 is adapted and it is unconditionally authenticated. However, an ex post facto confirmation is executed to the second communication terminal PD2. When the price of the commodity is more than the first predetermined value and is equal to or less than the second predetermined value, the authentication level 2 is adopted, and the authentication management company BS makes a prior confirmation about the purchase of the commodity to the second communication terminal PD2. When the price of the commodity is more than the second predetermined value, the authentication level 3 is adopted, and the authentication management company BS makes a prior confirmation about the purchase of the commodity to the first communication terminal PD1 and the second communication terminal PD2.

Although the authentication levels in Table 2 are set by the prices of the product alone, they can be adjusted based on the history of products purchased from the second communication terminal PD2, as shown in Table 4.

TABLE 4

Example of adjustments of authentication levels.

Authentication Level not modified (1) When the product purchase history of the second communication terminal PD2 recorded at the authentication control company BS is less than a specific value. The specific value is set by comprehensively judging the number of purchase times and the purchase amount of money.
(2) When the product purchase history of the second communication terminal PD2 recorded in the first communication terminal PD1 is less than a specific value. As with (1), the specific value is set by comprehensively determining the number of purchases and the amount of purchases.

Authentication Level lowered by 1.

(1) When the product purchase history of the second community terminal PD2 recorded in the authentication control company BS is more than a specific value.
(2) When the product purchase history of the second TABLE 4-continued Example of adjustments of authentication levels.

communication terminal PD2 recorded in the first communication terminal PD1 is more than a specific value.

In the evaluation of the purchase history in Table 4, if for example, the purchase amount of money of ¥100,000 is taken as the specific value of the purchase history as the condition for legal use, a comprehensive evaluation is made, such as calculating 10 purchases as being equivalent to ¥10,000 of purchases, and adding this to the purchase history, even if the purchase amount of money is less than ¥100,000.

Furthermore, the authentication level may be selected by comparing the past service provision history with the services to be provided at present, or the authentication level may be selected based on at least anyone of the cost of services, service provision area, service provision frequency and the total sum of money for the services provided.

As described above, appropriately simplifying the authentication procedure according to the authentication level can remarkably increase the convenience of the service device regarding the product provision.

Note that other parameters, for example, the geographic area of the first communication terminal, the first communication terminal itself; the type of product, or the like, may also be used for setting and adjusting the authentication levels.

Moreover, in the host computer HC, automatic analysis of product purchasing trends by the user may be used to lower the authentication level for a purchase of a product conforming to the analysis result, and to raise (increase the strictness of) the authentication level for the purchase of a product deviating from past trends.

Figure 4:
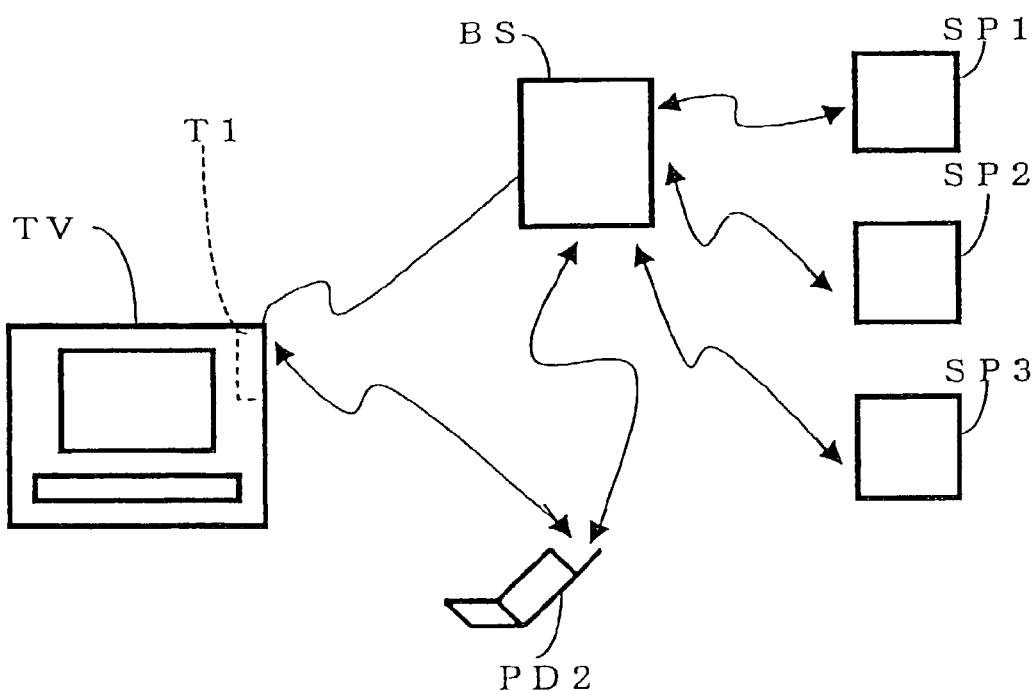
FIG. 4 is a block diagram illustrating the structure of a fourth embodiment of an authentication system as set forth in the present invention.

FIG. 4 illustrates a fourth embodiment wherein a first communication terminal T1 of a fixed line is used in place of the first communication terminal PD1 (for the mobile communication) in the third embodiment. The other constituent components are identical to those of the third embodiment, so descriptions thereof will be omitted. The aforementioned structure enables the application of the billing system of the present invention, even if the status of the mobile communication line in the location of installation of the service device is not good. Note that a structure can be used wherein the service device TV is used as the first communication terminal T1 and a telephone TV [sic] (T1) with a fixed line is used.

Figure 5:
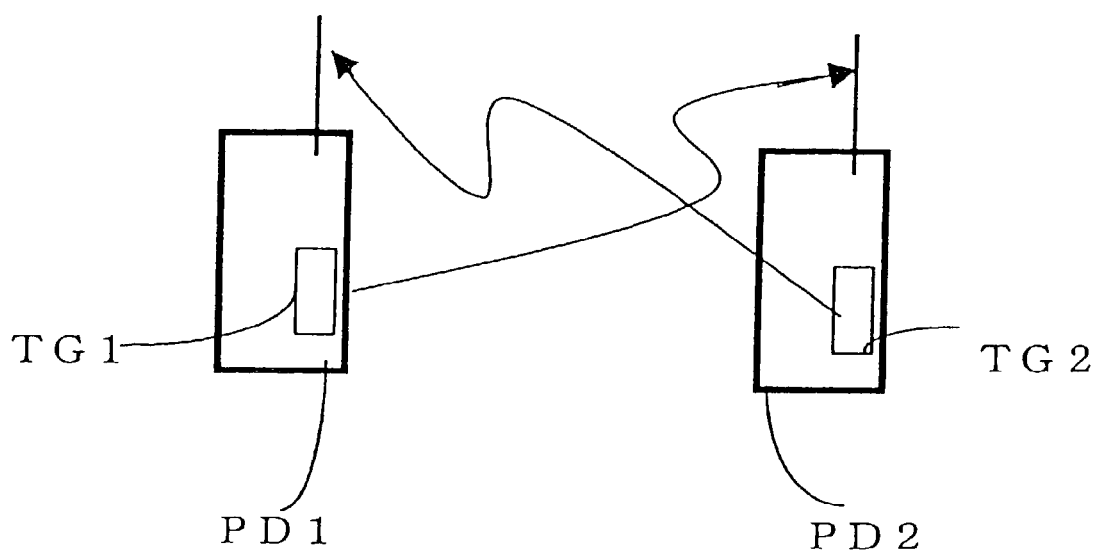
FIG. 5 is a diagram illustrating modified examples of the structures of the first and second communication terminals in the authentication system of FIG. 3.

FIG. 5 illustrates a modified example of the structure of a first communication terminal (for mobile communication) PD1 and a second mobile communication terminal (mobile communication device, portable telephone) PD2 in the third embodiment. Label tags TG1, TG2 are built into the first and second mobile communication terminals PD1, PD2, respectively, and these label tags send intrinsic signals of the first and second communication terminals PD1, PD2. The signals of label tags TG1, TG2 are received respectively by the antennas of the first and second communication terminals PD1, PD2 and, when both are detected by each other, the service device TV transmits billing information as billing for the second communication terminal PD2 to the authentication control company BS. That is, the first and second communication terminals PD1, PD2 operate as non-contact sensors and detect the electrical indexes issued by label tags TG1, TG2. The automatic detection of PD1 and PD2 by each other in this way eliminates the necessity of performing cumbersome operations such as calling the first communication terminal PD1 from the second communication terminal PD2 and inputting a code.

Obviously, radio communications by Bluetooth standards can be used in place of the communications by label tags. Additionally, the authentication control company BS may be the same as the product supplier company, simplifying the authentication system.

Figure 6:
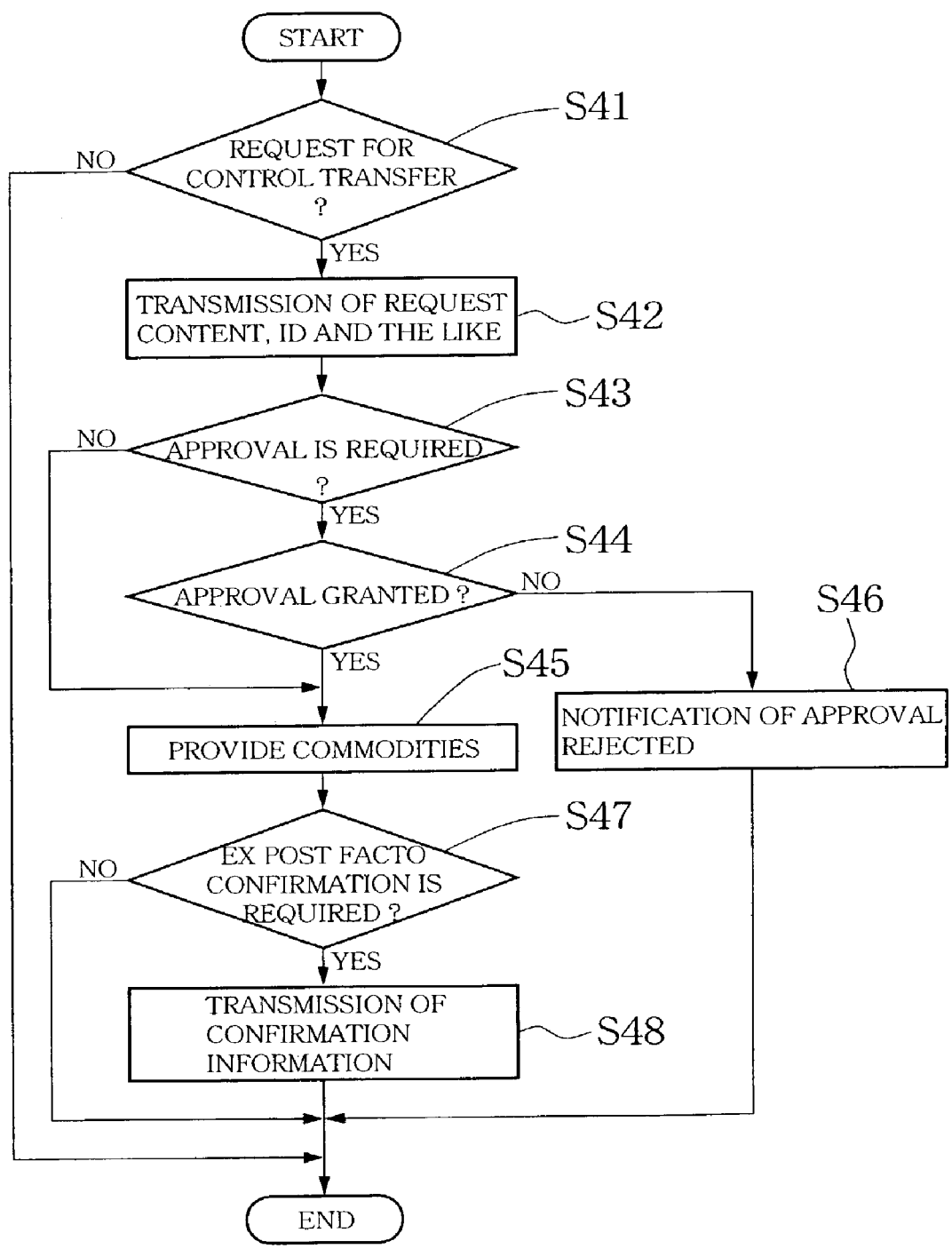
FIG. 6 is a flow chart illustrating the overall flow in an authentication system as set forth in the present invention.

FIG. 6 is a flowchart illustrating one example of the overall flow of the authentication system based on the control transfer request. Here, the adjustment of the authentication level shown in Table 4 is not performed, and a process is shown wherein only the conditions of Table 2 and Table 3 are used.

First, an operation wherein the second communication terminal PD2 calls the first communication terminal PD1, or the like, and determines whether or not a request for the control transfer has been made (Step S41), and the process is terminated if no request has been made.

If a request for control transfer has been made, the request details, namely, the product to be purchased, the prices thereof, and the like, and information regarding authentication such as the ID information regarding billing of the customer, and the like, are transmitted from the second communication terminal PD2 to the authentication control company BS (Step S42). In the first communication terminal, a determination is made, from the product prices and based on Table 2 and Table 3, whether or not the prices are of a low level not requiring an approval from the authentication control company BS, where if the approval is not required, the product is provided immediately (Step S45). If the approval is required, the product is provided (Step S45) when the approval from the authentication control company BS is granted (Step S44), and if the approval is not granted, a declined notification is provided to the second communication terminal PD2 (Step S46).

After the product is provided, a determination is made based on the Authentication Level 1 in Table 3 as to whether or not a confirmation is required after the fact (Step S47), and if confirmation is required after the fact, information regarding the purchase of the product, and the like, is sent from the authentication control company BS to the second communication terminal PD2, or the like (Step S48).

Figure 7:
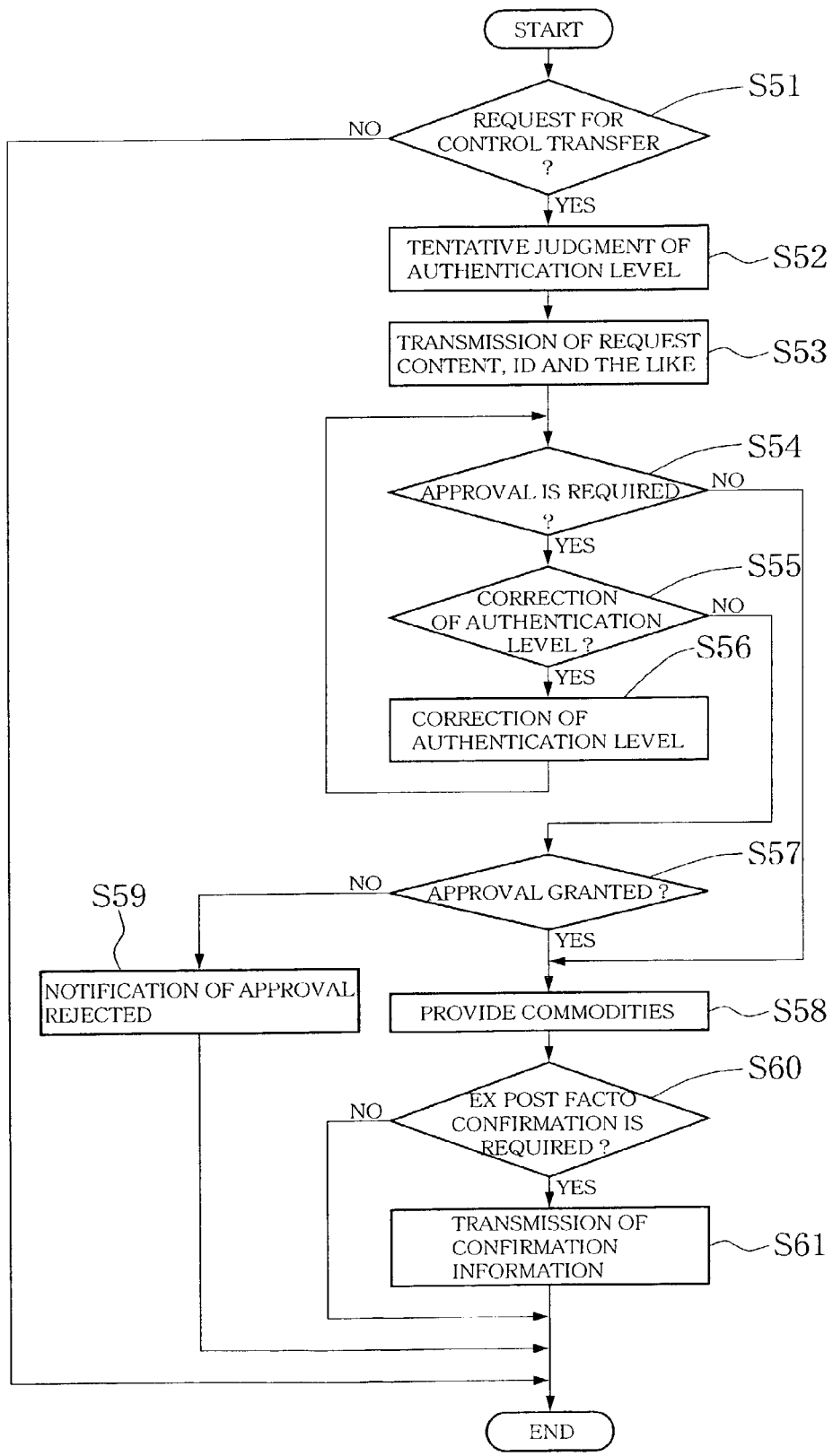
FIG. 7 is a flow chart illustrating the flow of adjustment of the authentication level in an authentication system as set forth in the present invention.

FIG. 7 is a flowchart illustrating the process flow in an authentication system that performs the adjustment of authentication levels shown in Table 4.

First, an operation wherein the second communication terminal PD2 calls the first communication terminal PD1, or the like, to determine whether or not a request for control transfer has been made (Step S51), and the process is terminated if no request has been made.

If a request for control transfer has been made, a tentative evaluation of the authentication level is made based on the prices of the product to be purchased and based on Table 2 (Step S52). Here the request details, namely, the product to be purchased, the price thereof, and the like, and information regarding authentication such as the ID information regarding billing of the customer, and the like, are transmitted from the second communication terminal PD2 to the authentication control company BS (Step 53). Next, in the first communication terminal, a determination is made based on the product price as to whether or not the product is of a low level that does not require the approval of the authentication control company BS, and if approval is not required, the product is provided immediately (Step S58). If the approval is required, it is determined whether adjustment of the authentication level is required or not based on Table 4 in the authentication control company BS, and if adjustment is required, the process returns to Step S54 after the adjustment of the authentication level. If adjustment is not required or has become unnecessary because of adjustment of the authentication level, the process advances to the decision (Step S57) as to whether the authentication is approved or not in the authentication control company BS.

If the approval is granted in Step S57, the product is provided (Step S58), but if the approval is not granted, the second communication terminal PD2 is notified that the approval is declined (Step S59).

After a product is provided, as with Authentication Level 3, a determination is made as to whether or not a confirmation is required after the fact (Step S60), and if confirmation is required after the fact, information regarding the purchase of the product, or the like, is sent from the authentication control company BS to the second communication terminal PD2 (Step S61).

Obviously, the control transfer for billing can be applied to any service device using any communication terminal other than the television TV.

The mobile communication device of the present invention is also embodied by a program that causes a computer to function as the present mobile communication device. This program may be stored on a recording medium capable of being read by a computer.

The recording medium that stores this program may be the first storage means MEM1 itself, shown in FIG. 1, or a CD-ROM, or the like, wherein a program reading unit such as the CD-ROM drive, or the like, is provided as the external storage unit, where the CD-ROM can be read thereby through the insertion of the recording medium.

Furthermore, the aforementioned recording medium may be a magnetic tape, a cassette tape, a floppy disc, a hard disc, MO/MD/DVD, or the like, or a semiconductor memory.

INDUSTRIAL APPLICABILITY

The present invention enables the provision of an authentication system that can provide an appropriate authentication process while guaranteeing the maximum convenience for the customer, when various kinds of products and services are provided, as well as a host computer, mobile communication device, program and recording medium for use in said authentication system.

The invention claimed is:

1. A method, comprising:
receiving a first request at a host computer, from a service device, for information regarding authentication of a user and identifying a price of a product or service to be purchased by the user, wherein the first request is in response to a transaction at the service device;
authenticating the transaction before confirming the transaction with the user in response to determining that the price is below a first threshold amount, which corresponds to a first authentication level; and
authenticating the transaction after confirming the transaction with the user in response to determining that the price is above the first threshold amount and less than or equal to a second threshold amount, which corresponds to a second authentication level, wherein the first threshold amount is less than the second threshold amount,
wherein the confirming comprises:
transmitting from the host computer to a mobile communications device a second request for user identification information in response to receiving the first request;
receiving the user identification information from the mobile communications device at the host computer in response to the second request;
comparing the user identification information and authentication information to generate comparison results; and
using the comparison results for the confirmation.

2. The method of claim 1, wherein identification information of the user includes personal attributes of the user.

3. The method of claim 1, further comprising receiving from the service device information regarding current products or services provided.

4. The method of claim 1, wherein the determining further comprises:
comparing a parameter of the transaction with a parameter of a past transaction.

5. The method of claim 4, wherein the parameter is the price of service, services provision area, service provision frequency, or total sum of money for services provided.

6. A host computer, comprising:
a receiver configured to receive a first request for information from a service device regarding authorization of a user and identifying at least a price of a product or service to be purchased by the user, wherein the first request is in response to a transaction at the service device;
a transmitter configured to transmit a second request for user identification information to a mobile communications device in response to receiving the first request, such that the mobile communications device is configured to transmit, in response to the second request, user identification information to the receiver; and
a comparing device configured to compare the user identification information and authentication information to generate comparison results;
wherein authentication of the transaction is performed before confirming the transaction with the user in response to determining that the price is below a first threshold amount, which corresponds to a first authentication level,
wherein authentication of the transaction is performed after confirming the transaction with the user in response to determining that the price is above the first threshold amount and is less than or equal to a second threshold amount, which corresponds to a second authentication level, wherein the first threshold amount is less than the second threshold amount.

7. A communications device, comprising:
a receiver operable to receive, from a host computer, a second request for information regarding authentication of a user at a service device, wherein the second request is in response to a first request from the service device, and the first request is in response to a transaction at the service device, wherein the transaction has a numeric value associated with it;
a storage device operable to store information regarding the authentication of the user; and a transmitter operable to transmit information regarding the authentication of the user, stored in the storage device, to the host computer in response to receiving the second request for information regarding the authentication of the user;
wherein the communications device is a mobile communications device,
wherein the second request for information is received after the transaction has been authenticated when a first one of a plurality of independent authentication levels is used for the transaction in response to determining that the numeric value is below a first threshold amount, and
wherein the second request for information is received before the transaction has been authenticated when a second one of the plurality of independent authentication levels is used for the transaction in response to determining that the numeric value is above the first threshold amount and is less than or equal to a second threshold amount, wherein the first threshold amount is less than the second threshold amount.

8. The communications device of claim 7, wherein the transmitter is further operable to selectively transmit, to the host computer, information regarding the authentication of the user based on a type of authentication requested.

9. A non-transitory computer-readable storage medium having instructions stored thereon, the instructions comprising:
- instructions for receiving a first request at a host computer, from a service device, for information regarding authentication of a user and identifying at least a price of a product or service to be purchased by the user, wherein the first request is in response to a transaction at the service device;
- instructions for authenticating the transaction before confirming the transaction with the user in response to determining that the price is below a first threshold amount, which corresponds to a first authentication level;
- instructions for authenticating the transaction after confirming the transaction with the user in response to determining that the price is above the first threshold amount and is less than or equal to a second threshold amount, which corresponds to a second authentication level, wherein the first threshold amount is less than the second threshold amount;
- instructions for confirming the transaction with the user by transmitting a second request for user identification information from the host computer to a mobile communications device in response to receiving the first request and receiving the user identification information from the mobile communications device at the host computer in response to the second request;
- instructions for comparing the user identification information and authentication information to generate comparison results; and
- instructions for using the comparison results for confirming the transaction.

10. The host computer of claim 6, wherein the user identification information includes personal attributes of the user.

11. The host computer of claim 6, wherein the receiver is further operable to receive from the service device information regarding current services provided.

12. The host computer of claim 6, wherein a parameter of the transaction is the price of service, services provision area, service provision frequency, or total sum of money for services provided.

13. The host computer of claim 6, wherein the determining device is further operable to compare a parameter of the transaction with a parameter of a past transaction.

14. The method of claim 1, further comprising:
- authenticating the transaction after confirming the transaction with the user at the mobile communications device and after confirming the transaction with the user at the service device in response to determining that the price is above the second threshold amount, which corresponds to a third authentication level.

* * * * *